United States Patent
Lee et al.

(10) Patent No.: US 8,036,525 B2
(45) Date of Patent: Oct. 11, 2011

(54) METHOD AND APPARATUS FOR MOTION COMPENSATION

(75) Inventors: Yong-Gu Lee, Seoul (KR);
Young-Kwon Yoon, Seoul (KR);
Ok-Sam Chae, Yongin-si (KR); Md Hasanul Kabir, Yongin-si (KR)

(73) Assignees: Samsung Electronics Co., Ltd (KR); University-Industry Cooperation Group of Kyung Hee University (KR)

( * ) Notice: Subject to any disclaimer, the term of this patent is extended or adjusted under 35 U.S.C. 154(b) by 0 days.

(21) Appl. No.: 12/727,649

(22) Filed: Mar. 19, 2010

(65) Prior Publication Data

US 2010/0239239 A1    Sep. 23, 2010

(30) Foreign Application Priority Data

Mar. 19, 2009 (KR) .................. 10-2009-0023618

(51) Int. Cl.
*G03B 7/093* (2006.01)

(52) U.S. Cl. ........................... 396/153; 396/246

(58) Field of Classification Search .............. 396/95, 396/153, 213, 233, 234, 246; 348/208.12, 348/208.14, 208.16
See application file for complete search history.

(56) References Cited

U.S. PATENT DOCUMENTS

| | | | | |
|---|---|---|---|---|
| 4,959,658 A | * | 9/1990 | Collins | 343/786 |
| 5,461,452 A | * | 10/1995 | Iwasaki | 396/51 |
| 5,475,466 A | * | 12/1995 | Iwasaki et al. | 396/153 |
| 5,801,970 A | * | 9/1998 | Rowland et al. | 703/6 |
| 6,263,089 B1 | * | 7/2001 | Otsuka et al. | 382/107 |
| 7,697,836 B2 | * | 4/2010 | Pozniansky et al. | 396/159 |
| 7,773,145 B2 | * | 8/2010 | Yamaguchi | 348/345 |
| 2001/0012449 A1 | * | 8/2001 | Kawabe et al. | 396/234 |
| 2006/0115297 A1 | | 6/2006 | Nakamaru | |
| 2008/0101786 A1 | | 5/2008 | Pozniansky et al. | |
| 2009/0128640 A1 | * | 5/2009 | Yumiki | 348/208.6 |

FOREIGN PATENT DOCUMENTS

| | | |
|---|---|---|
| EP | 1 874 043 | 1/2008 |
| JP | 11-097512 | 4/1999 |
| KR | 1019950069717 | 12/1998 |

* cited by examiner

*Primary Examiner* — W. B. Perkey

(74) *Attorney, Agent, or Firm* — The Farell Law Firm, P.C.

(57) ABSTRACT

A motion compensation apparatus for a camera module with a half-shutter function is provided. The apparatus includes an initialization unit for selecting a subject, a motion of which is to be detected, from images secured in a half-shutter state, and calculates motion information of the subject; a tracking unit for tracking the selected subject and the motion information provided from the initialization unit, and calculates prediction information of the subject; and a controller for generating a control signal for controlling a speed of a shutter and a sensibility of an image sensor based on the prediction information provided from the tracking unit.

14 Claims, 3 Drawing Sheets

METHOD AND APPARATUS FOR MOTION COMPENSATION

PRIORITY

This application claims priority under 35 U.S.C. §119(a) to a Korean Patent Application filed in the Korean Intellectual Property Office on Mar. 19, 2009 and assigned Serial No. 10-2009-0023618, the entire contents of which are incorporated herein by reference.

BACKGROUND OF THE INVENTION

1. Field of the Invention

The present invention relates generally to a method and apparatus for minimizing blurring of a captured image, and more particularly, to a method and apparatus for minimizing image blurring caused by motion of a subject.

2. Description of the Related Art

Devices for taking pictures of a subject may be classified into camcorders for capturing moving images and cameras for capturing still images. Recently, digital cameras that can capture both still and moving images have also been produced.

In imaging devices for picture taking, such as camcorders and digital cameras, light incident from a subject is converted and recorded by a photosensitive means such as an image sensor or film. The camera requires an exposure time during which a subject can be photo-sensed or exposed. Movement of a subject during the exposure time may result in a motion-blurred image.

As a solution for suppressing the motion blurring caused by motion of a subject, Panasonic Corporation (hereinafter, "Panasonic") launched a LUMIX® digital camera with an intelligent ISO (International Standard Organization) function. The intelligent ISO function by Panasonic divides an image into four equal areas, compares each of the four areas with a corresponding same area in a previous image to calculate a motion, and applies the calculated motion to adjusting a shutter speed and ISO value (or light sensitivity) of an image sensor.

In addition, Korean Patent Application No. 10-1995-0069717 filed by Samsung Electronics discloses a method for measuring a brightness of an initially taken image and then adjusting an iris size and a shutter speed based on the brightness to take a clearer image. Another conventional method includes detecting an entire motion of a background from a continuous image sequence received in a preview mode for previewing a captured image, and then executing a specific function of a camera according to motion of the camera.

The methods described above may be classified into two major types of methods. One such type of method includes combining a subject portion of a focused image with a small motion of the subject among multiple captured images, with a background of another image. The other such type of method includes measuring an illuminance of a subject or a background and adjusting an exposure condition like a shutter speed, and ISO value of an image sensor based on the illuminance measurement.

However, the method and apparatus proposed by Panasonic, which suppresses motion of a subject, requires a separate image stabilization device for suppressing blurring of a captured image due to hand vibration. Panasonic's method for preventing image blurring is not easily applied to a portable digital device that does not, or may not, include the image stabilization device.

However, the method of suppressing blurring caused by motion of a subject by measuring a brightness of the subject or a background and adjusting exposure conditions according to the brightness, does not suppress the image blurring caused by the motion of the subject when the opening time of a shutter is too long in view of a moving speed of the subject.

Images received in a Live View mode are dark and include many noises because resolution of Live View mode images is low and a flash cannot be used. Therefore, suppression of subject's motion is restricted, and quality of compensated images decreases. In addition, the Panasonic's method requiring a separate image stabilization device may not be easily applied in small portable communication terminals preferred by users.

SUMMARY OF THE INVENTION

An aspect of the present invention is to address at least the above-mentioned problems and/or disadvantages and to provide at least the advantages described below. Accordingly, an aspect of the present invention provides an imaging method and apparatus that may be applied to a small portable digital terminal to minimize image blurring and quality degradation caused by motion of a subject.

In accordance with one aspect of the present invention, there is provided a motion compensation apparatus for a camera module with a half-shutter function, in which an initialization unit selects a subject, a motion of which is to be detected, from images secured in a half-shutter state, and calculates motion information of the subject; a tracking unit tracks the selected subject and the motion information provided from the initialization unit, and calculates prediction information of the subject; and a controller generates a control signal for controlling a speed of a shutter and a sensibility of an image sensor based on the prediction information provided from the tracking unit.

BRIEF DESCRIPTION OF THE DRAWINGS

The above and other aspects, features and advantages of certain embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EMBODIMENTS

The following description with reference to the accompanying drawings is provided to assist in a comprehensive understanding of embodiments of the invention as defined by the claims and their equivalents. It includes various specific details to assist in that understanding but these are to be regarded as mere examples. Accordingly, those of ordinary skill in the art will recognize that various changes and modifications of the embodiments described herein can be made without departing from the scope and spirit of the invention.

In addition, descriptions of well-known functions and constructions are omitted for clarity and conciseness.

The present invention relates to a digital camera module that has a half-shutter function and uses an image sensor. More particularly, the present invention relates to a method and apparatus capable of minimizing image blurring caused by motion of a camera or a subject without a mechanical means.

According to the present invention, an initialization unit selects a subject from images obtained in a half-shutter state, calculates an initial motion vector of the selected subject, and delivers the calculated motion vector to a tracking unit. The tracking unit tracks a subject based on information provided from the initialization unit, and calculates a prediction result for the motion vector. If a user provides user input that indicates a decision to take a picture, the tracking unit sends the selected subject and the prediction result for the motion vector to a controller. The controller adjusts exposure information (e.g., shutter speed) of a camera and ISO value of an image sensor based on the information provided from the tracking unit.

Figure 1:
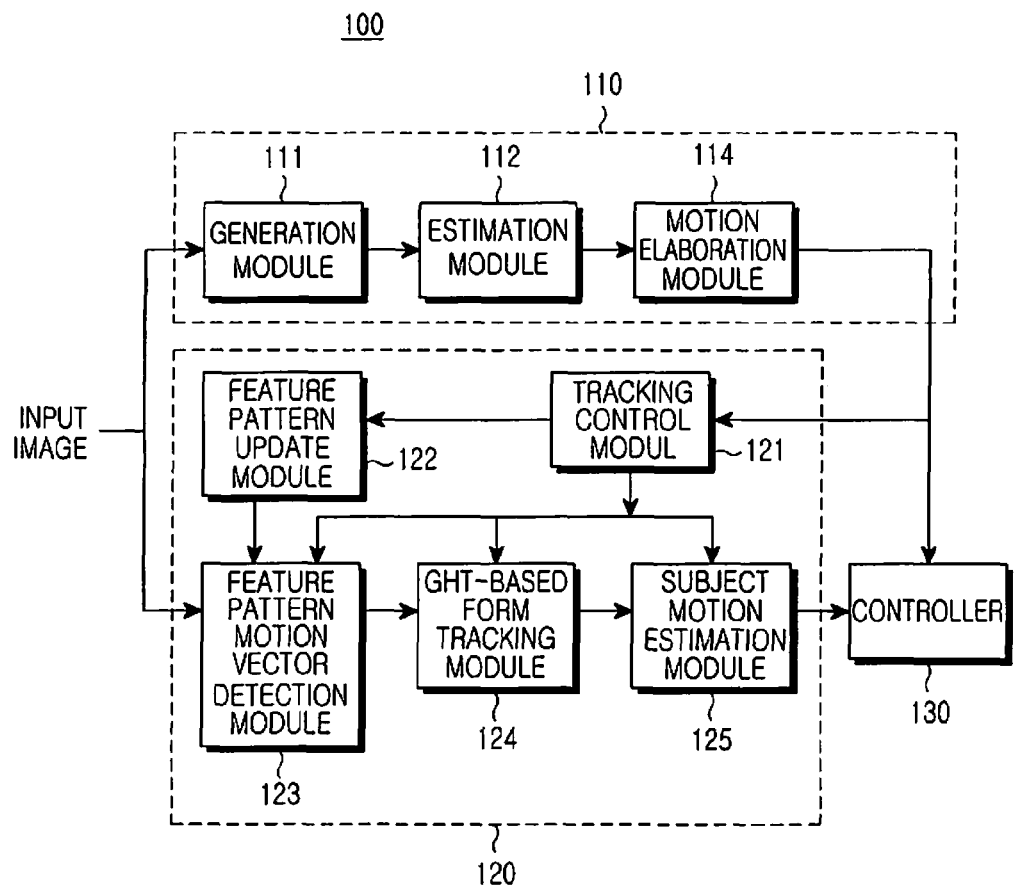
FIG. 1 is a block diagram showing a schematic structure of a motion compensation apparatus according to an embodiment of the present invention.

FIG. 1 shows a schematic structure of a motion compensation apparatus according to an embodiment of the present invention. Referring to FIG. 1, a motion compensation apparatus 100 for compensating for motion of a camera and a subject according to an embodiment of the present invention includes an initialization unit 110 for selecting a subject, a motion of which is to be detected, from images secured in a half-shutter state, and calculating motion information of the selected subject; a tracking unit 120 for tracking the selected subject based on the selected subject and motion information provided from the initialization unit 110, and calculating prediction information of the subject; and a controller 130 for generating a control signal for controlling a speed of a shutter and an ISO value of an image sensor based on the prediction information provided from the tracking unit 120.

If the shutter is pressed in a half-shutter state, the initialization unit 110 starts operating. In operation, the initialization unit 110 selects a subject, a motion vector of which is to be calculated, from adjacent images continuously received in the half-shutter state, and calculates motion information of the selected subject. The subject selected by the initialization unit 110 and the motion information of the subject are provided to the tracking unit 120. In accordance with the present invention, the controller 130 controls a shutter speed of a camera and controls an ISO value of an image sensor based on motion information of the camera and the subject, which is tracked and predicted by the initialization unit 110 and the tracking unit 120.

The initialization unit 110 includes a generation module 111 for generating easily recognizable_feature patterns (e.g., edge patterns) of a subject, an estimation module 112 for tracking feature patterns generated by the generation module 111, calculating a motion vector of each of the feature patterns, accumulating the motion vector calculated by the estimation module 112 in Hough space and extracting initial motion information of a camera module and a subject, and a motion elaboration module 114 for calculating an initial motion of the camera module and the subject based on additional information.

Figure 2:
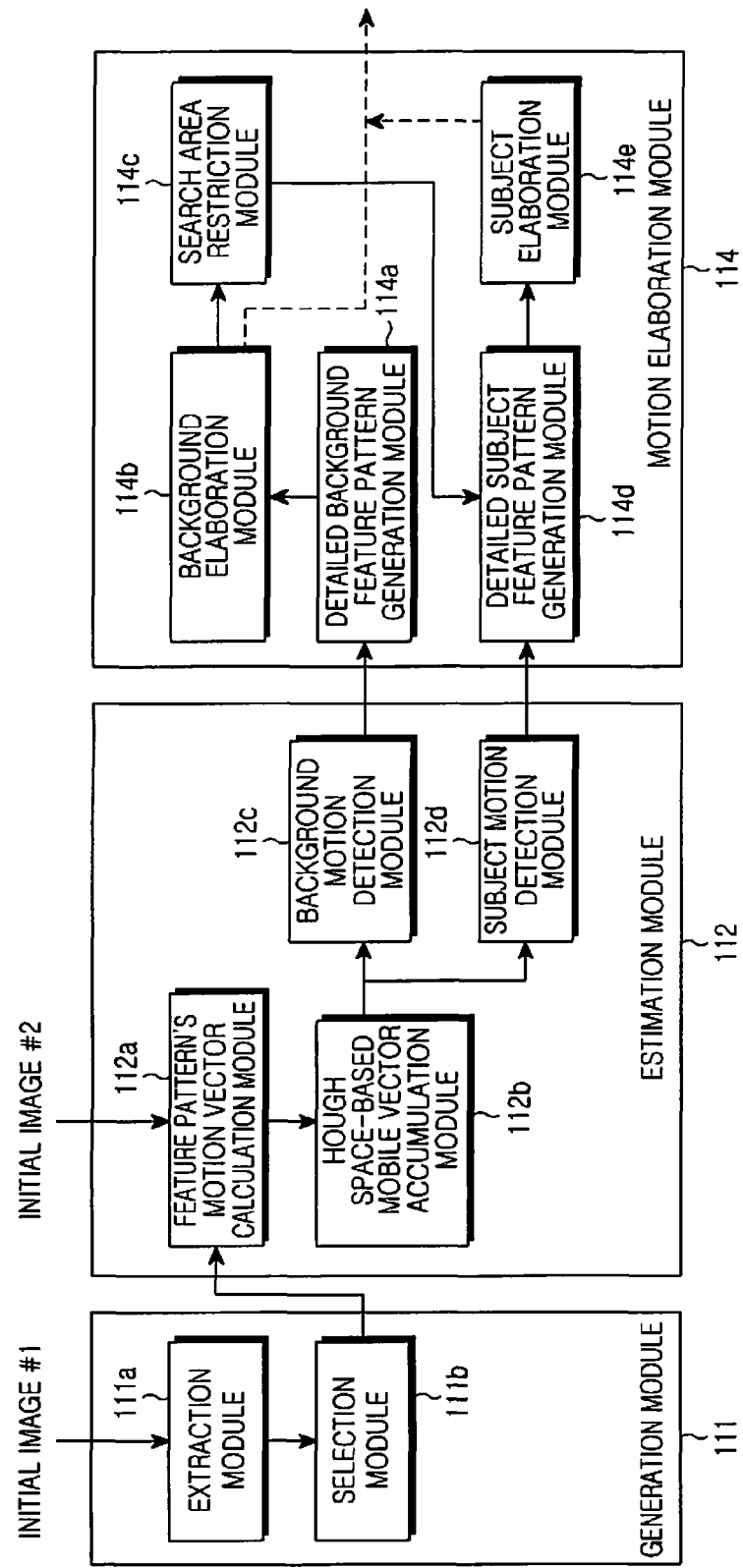
FIG. 2 is a diagram showing a detailed structure of the initialization unit shown in FIG. 1.
Figure 3:
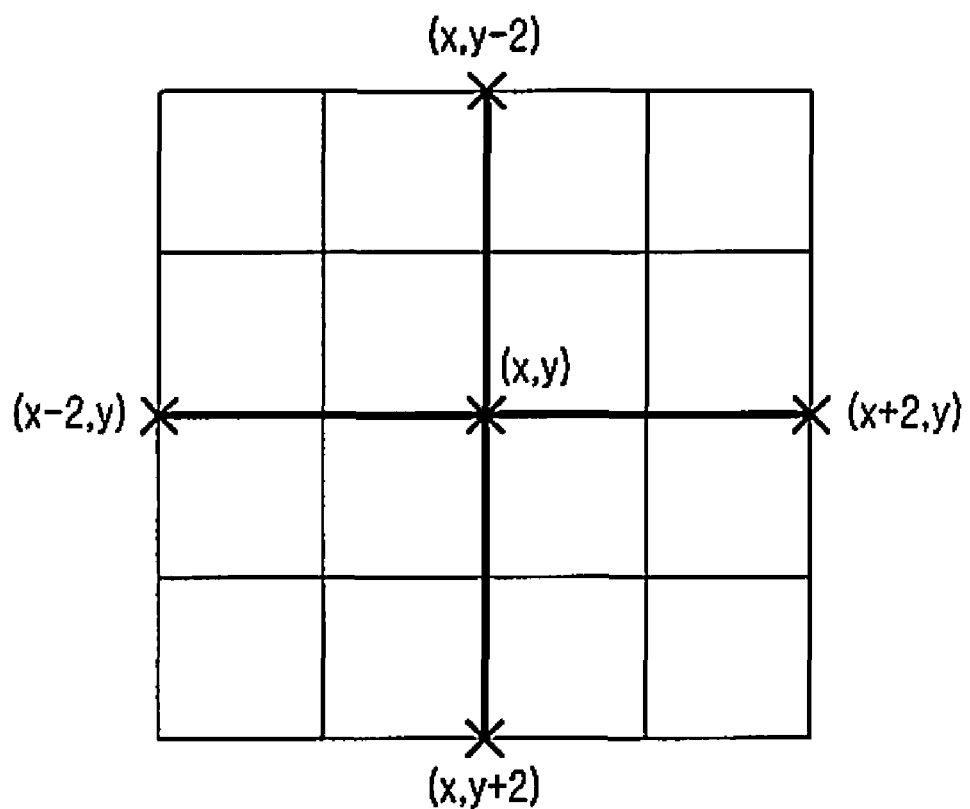
FIG. 3 is a diagram showing an image partitioned into multiple blocks to describe a feature pattern according to an embodiment of the present invention.

FIG. 2 shows a detailed structure of the initialization unit 110 shown in FIG. 1. Referring to FIG. 2, the generation module 111 selects feature patterns, which may be features of a subject (which may include easily recognizable patterns, such as edge patterns, for example), from images obtained in the half-shutter state. More specifically, the generation module 111 partitions a first input image into multiple blocks in a tile form as shown in FIG. 3, and extracts each block with a large brightness change, such as the corner, as a feature pattern. The feature patterns, as shown in FIG. 3, may be determined by calculating brightness differences between the central pixel (x,y) and four adjacent pixels (x,y−2), (x−2,y), (x+2,y) and (x,y+2) and determining a combination of a central pixel and four adjacent pixels which represent the largest brightness difference, as a feature pattern.

The generation module 111 includes an extraction module 111a for dividing an input image into multiple non-overlapping blocks and then extracting an initial feature pattern representing each block, and a selection module 111b for selecting initial key feature patterns with a large motion from among the initial patterns. The extraction module 111a divides an image (initial image #1), in which a subject's motion is to be calculated, into multiple blocks having the form shown in FIG. 3, and the selection module 111b selects initial feature patterns (i.e. edge patterns) located in the boundaries or edges of the subject.

Preferably, if it is desired to achieve fast calculation, the present invention tracks motion of a subject by selecting the block (i.e., the block having an edge of the subject) having a large contribution to location calculation from among the blocks. However, if accurate motion tracking is required, the present invention tracks feature patterns of all blocks.

The estimation module 112 includes a feature pattern's motion vector calculation module 112a, a Hough space-based motion vector accumulation module 112b, a background motion detection module 112c for calculating motion information of a background other than the subject included in the image, and a subject motion detection module 112d for calculating an initial motion of the subject. The feature pattern's motion vector calculation module 112a searches for feature patterns extracted from a previous image (initial image #1) in the current image (initial image #2). The estimation module 112 extracts initial motion information of a camera module and a subject by accumulating motion vectors of feature patterns in a Hough space. The motion elaboration module 114 selects a feature pattern that has contributed to extraction of initial motion information, extends the selected feature pattern to a 9×9 pattern and performs more accurate matching thereon, thereby increasing accuracy of initial motion information.

The estimation module 112 performs feature pattern's motion vector calculation, Hough space-based motion vector accumulation, subject's initial motion estimation, and camera's initial motion estimation. The feature pattern's motion vector calculation by the feature pattern's motion vector calculation module 112a is possible by tracking feature patterns extracted from the previous image (initial image #1) in the current image (image #2). For this purpose, it is possible to set a search range of the current image according to an expected motion value, and search for a 5-pixel feature pattern by correlation analysis. If a new location of the feature pattern is determined, a motion vector may be calculated by comparing a location of the feature pattern in the previous image with a location of the feature pattern in the current image.

For the Hough space-based motion vector accumulation by the Hough space-based motion vector accumulation module 112b, an accumulator of a 2-dimensional array may be used, such that a Hough space may be searched by a motion vector (dx,dy). Accumulation of the motion vector may include increasing values of cells of the accumulator, which are indicated by motion vectors of the respective feature patterns. Error in vector calculation may be minimized by adding a weight being inversely proportional to a distance from the center cell, to adjacent cells of the cell indicated by a motion vector and increasing values of adjacent cells according to the weight. Through this process, the information accumulated in the accumulator minimizes vector calculation error. Such calculation errors may occur due to noise and image conditions. The accumulated information also provides the ground that is a basis for an accurate initial motion of the camera and the subject can be extracted.

In the initial motion estimation by each of the background motion detection module 112c and the subject motion detection module 112d, an initial motion is determined by locations of peaks extracted from the accumulator that accumulated feature patterns existing in the edges of the image. Peaks of the accumulator refer to motion vectors of the camera and the subject. For more accurate motion vector calculation, peak locations are determined using Gaussian matching. A subject's initial motion may be determined through an extraction of peaks performed by the accumulator that accumulated motion vectors of all feature patterns.

The motion elaboration module 114, which improves accuracy of initial information, generates feature patterns to which a weight determined according to contribution is applied, based on the initially obtained information, and searches for the weight-applied feature patterns in a restricted area of the image, thereby improving accuracy of initially required information. The motion elaboration module 114 includes a detailed background feature pattern generation module 114a for generating extended background feature patterns, a background elaboration module 114b for improving accuracy of an initial motion vector of the camera based on additional information, a search area restriction module 114c for restricting a target area in the image, a detailed subject feature pattern generation module 114d for generating extended subject feature patterns, a motion of which is to be calculated, and a subject elaboration module 114e for improving accuracy of each selected subject based on additional information.

The detailed background feature pattern generation module 114a and the detailed subject feature pattern generation module 114d select the feature patterns that have contributed to forming a background peak and a subject peak of the accumulator. That is, a certain range from a peak for obtaining feature patterns with a large motion is established in the accumulator, and initial feature patterns, having been converted into cells, cell values of which are in the certain range are selected. A feature pattern to be used in a elaboration process is defined as a 9×9 image pattern that includes the selected initial feature pattern in the center thereof. That is, initial feature patterns composed of 5 pixels in the 5×5 area as shown in FIG. 3 may be extended to a 9×9 area, and all pixels belonging thereto may be included as feature patterns.

The background elaboration module 114b searches for extended feature patterns in the search area defined based on initial background information, and determines more precise locations based on the searched feature patterns.

The subject elaboration module 114e undergoes a process of compensating for motion of a camera. Motion of a subject is related to the motion of a camera. For example, if a camera is tracking a particular subject, motion of the subject may not exist between two frames. Therefore, the motion of the camera should be compensated for in order to find an accurate motion vector of each subject. Some ordinary cameras do not have the above problem compensating for motion of the camera since those cameras may have a means for compensating for motion of the camera itself by hardware or software. However, because a camera mounted in a portable digital device may not have a mechanical means for compensating for motion of the device, compensation for motion of the device itself is required. The subject elaboration module 114e may employ a method for finding a difference image of an overlapping portion by matching the previous image to the current image based on the estimated motion vector of the camera, thereby offsetting background information in the overlapping area. In the difference image, since the motion of a camera is cancelled, only the motion of a subject appears. However, the difference image may include many noises caused by various noises and a motion estimation error of the camera.

A key interested area in the current image, in which a subject is to be tracked, may correspond to an area where motion of the subject exists and a brightness difference is large in a difference image. In order to separate the interested area, a histogram of the difference image is approximated to a Gaussian distribution $N(\mu,\sigma)$ with an average of 0 and $3\sigma$ is set as a threshold T, thereby implementing binarization.

As a feature pattern used for elaboration of a particular subject, the detailed subject feature pattern generation module 114d selects a pattern overlapping an interested area obtained by the search area restriction module 114c through the binarization from the obtained feature patterns. A more accurate location of a subject may be determined, by the subject elaboration module 114e, as in the background elaboration module 114b using the extracted feature patterns. However, the search is performed in the interested area created in the difference image, contributing to reduction in calculation.

Referring to FIG. 1, the tracking unit 120 includes a tracking control module 121 for defining the next location of a subject and a search range and controlling subject tracking, a feature pattern update module 122 for updating a feature pattern used to search for a subject in a new image, a feature pattern motion vector detection module 123 for calculating a motion vector of each feature pattern in the new image, a Generalized Hough Transform (GHT)-based form tracking module 124 for recognizing the entire form of the subject and determining a new location of the subject based on the searched feature pattern, and a subject motion estimation module 125 for calculating an accurate location of a subject based on the GHT result (subject form based on GHT).

The tracking unit 120 selects a subject from an image based on the subject and motion-related initial information provided from the initialization unit 110, and compares information provided from the initialization unit 110 with information calculated by the tracking unit 120, thereby predicting motion information of the subject. The present invention provides a means and method for extracting motion information of a subject or a camera based on poor live-view image data, and reflecting the extracted motion information in photographing conditions. Therefore, edge characteristics less sensitive to lighting, global Hough conversion, and GHT-based subject motion tracking for fast information extraction upon press of a shutter button may be applied to the method and apparatus for suppressing vibration of a subject according to an embodiment of the present invention. Therefore, the present invention may increase the accuracy and operation speed by utilizing a coarse-to-fine approach that selects initial candidates using a simple global algorithm and then performs more detailed analysis on a small number of candidates. In addition, the speed and accuracy of the operation may also be easily adjusted according to the hardware environment and operating conditions of the motion compensation apparatus 100 to be mounted in the portable digital device.

The apparatus and method according to the present invention tracks a background and one representative subject. The apparatus and method according to the present invention first initializes a predictor included in a tracking control unit 121, for predicting a location where a subject will appear in the next image, based on the information acquired during initialization, and then generates a reference pattern for finding an subject from an input image. The reference pattern may be formed based on the feature patterns extracted during initialization. A center point of the extracted feature patterns is first determined by calculating an average of central coordinates of the extracted feature patterns and each vector connecting the point corresponding to the calculated average to a center of a corresponding one of the feature patterns is calculated and stored in a table. This table may be a reference pattern (R-table). The tracking control unit 121 sets, in an input image, the entire search area and a search area of each feature pattern used to search for a subject using predicted information. The GHT-based form tracking module 124 performs GHT by determining a new location of a relevant feature pattern in a search area of each feature pattern and then using the new location information. An R-table formed in the previous image is used for GHT. As to the overall location change of a subject, the location is determined as a location of a peak in accumulator arrangement for GHT. With use of relative location information of the feature patterns for GHT, it is possible to determine a more accurate location of the subject while reducing interference of noises and/or background.

If a new location of a subject is determined, a predictor is updated based on the new location, enabling more accurate prediction, and a feature pattern and an R-table to be used in a difference image are updated. Update of the feature pattern is an important process that influences performance of a tracking system. Therefore, the feature pattern update process newly adds feature patterns in which changed subject information is reflected, and has flexibility in deleting undistinguishable feature patterns.

As is apparent from the foregoing description, when a camera and a subject move independently or simultaneously, the apparatus and method according to embodiments of present invention determines proper shutter speed and ISO value of an image sensor by accurately calculating motion of the subject, thereby minimizing image blurring caused by motion of the subject or the camera itself. In addition, embodiments the present invention may be implemented without a separate mechanism for preventing vibration, so the invention may be applied to small portable terminals.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A motion compensation apparatus for a camera module with a half-shutter function, the motion compensation apparatus comprising:
    an initialization unit for selecting a subject, a motion to be detected from images secured in a half-shutter state, and calculating motion information of the subject;
    a tracking unit for tracking the selected subject and the motion information provided from the initialization unit, and calculating prediction information of the subject; and
    a controller for generating a control signal for controlling a speed of a shutter and a sensitivity of an image sensor based on the prediction information provided from the tracking unit,
    wherein the initialization unit includes a generation module for generating feature patterns of the subject and an estimation module for tracking the feature patterns generated by the generation module.

2. The motion compensation apparatus of claim 1, wherein the estimation module calculates a motion vector of each of the feature patterns, accumulates the motion vectors calculated by the estimation module in a Hough space and extracts initial motion information of the camera module and the subject.

3. The motion compensation apparatus of claim 2, wherein the initialization unit further comprises a motion elaboration module for calculating an initial motion of the subject based on additional information obtained by extending the feature patterns.

4. The motion compensation apparatus of claim 3, wherein the motion elaboration module comprises:
    a background elaboration module for improving an accuracy of an initial motion vector of the camera module based on the additional information;
    a search area restriction module for restricting a target area in an image, a motion of which is to be calculated; and
    a subject elaboration module for improving an accuracy of each selected subject based on the additional information.

5. The motion compensation apparatus of claim 2, wherein the generation module comprises:
    an extraction module for dividing an input image into multiple non-overlapping blocks, and then determining an initial pattern representing each of the non-overlapping blocks; and
    a selection module for selecting, from the initial patterns, a key feature pattern for selecting initial patterns having a large motion.

6. The motion compensation apparatus of claim 5, wherein the initial patterns selected by the selection module are located in a boundary of the subject.

7. The motion compensation apparatus of claim 2, wherein the estimation module comprises:
    a background motion detection module for calculating motion information of a background other than the subject; and
    a subject motion detection module for calculating an initial motion of the subject.

8. A method for performing motion compensation in a camera module with a half-shutter function, the method comprising the steps of:
    selecting, by an initialization unit, a subject, a motion of which is to be detected; from images secured in a half-shutter state;
    calculating, by the initialization unit, motion information of the subject;
    tracking, by a tracking unit, the selected subject based on the motion information provided from the initialization unit;
    calculating, by the tracking unit, prediction information of the subject; and
    generating, by a controller, a control signal for controlling a speed of a shutter and a sensibility-sensitivity of an image sensor based on the prediction information provided from the tracking unit,
    wherein the initialization unit includes a generation module for generating feature patterns of the subject and an estimation module for tracking the feature patterns generated by the generation module.

9. The method of claim 8, further comprising:
    calculating, by the estimation module, a motion vector of each of the feature patterns;

accumulating, by the estimation module, the motion vectors calculated by the estimation module in a Hough space; and extracting, by the estimation module, initial motion information of the camera module and the subject.

10. The method of claim 9, further comprising, calculating, by a motion elaboration module within the initialization unit, an initial motion of the subject based on additional information obtained by extending the feature patterns.

11. The method of claim 10, further comprising:
improving, by a background elaboration module within the motion elaboration module, an accuracy of an initial motion vector of the camera module based on the additional information;
restricting, by a search area restriction module within the motion elaboration module, a target area in an image, a motion of which is to be calculated; and
improving, by a subject elaboration module within the motion elaboration module, an accuracy of each selected subject based on the additional information.

12. The method of claim 9, further comprising:
dividing, by an extraction module within the generation module, an input image into multiple non-overlapping blocks, and then determining an initial pattern representing each of the non-overlapping blocks; and
selecting, by a selection module within the generation module, from the initial patterns, a key feature pattern for selecting initial patterns having a large motion.

13. The method of claim 12, wherein the initial patterns selected by the selection module are located in a boundary of the subject.

14. The method of claim 9, further comprising:
calculating, by a background motion detection module within the estimation module, motion information of a background other than the subject; and
calculating, by a subject motion detection module within the estimation module, an initial motion of the subject.

* * * * *